United States Patent
Harakas et al.

(10) Patent No.: US 9,976,096 B2
(45) Date of Patent: *May 22, 2018

(54) BIODIESEL GLYCEROL EMULSION FUEL MIXTURES

(71) Applicant: SeaChange Group LLC, Brunswick, ME (US)

(72) Inventors: George N. Harakas, Blue Hill, ME (US); Scott J. Eaton, Hampden, ME (US); Richard W. Kimball, Nottingham, NH (US); Brandon G. Braley, Cumberland, ME (US); Robert C. Ring, Anchorage, AK (US)

(73) Assignee: SeaChange Group LLC, Brunswick, ME (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/056,227

(22) Filed: Feb. 29, 2016

(65) Prior Publication Data

US 2016/0177207 A1    Jun. 23, 2016

Related U.S. Application Data

(63) Continuation of application No. 14/713,585, filed on May 15, 2015, now Pat. No. 9,303,228.
(Continued)

(51) Int. Cl.
    *C10L 1/18*    (2006.01)
    *C10L 1/32*    (2006.01)
    (Continued)

(52) U.S. Cl.
    CPC ............... *C10L 1/328* (2013.01); *C10L 1/12* (2013.01); *C10L 1/18* (2013.01); *C10L 10/02* (2013.01);
    (Continued)

(58) Field of Classification Search
    CPC .. C10L 1/328; C10L 10/14; C10L 1/12; C10L 10/08; C10L 10/02; C10L 1/1826;
    (Continued)

(56) References Cited

U.S. PATENT DOCUMENTS 3,458,294 A    7/1969    Nixon
3,615,290 A    10/1971   Nixon
(Continued)

FOREIGN PATENT DOCUMENTS

| EP | 1 918 354 | 5/2008 |
| GB | 2276175 A | 9/1994 |
| WO | WO2011028183 | * 3/2011 |

OTHER PUBLICATIONS

Abbaszaadeh et al., "Current biodiesel production technologies: A comparative review," Energy Conservation and Management, 63:138-148 (2012).
(Continued)

*Primary Examiner* — Cephia D Toomer

(74) *Attorney, Agent, or Firm* — Foley Hoag LLP

(57) ABSTRACT

The invention provides fuel mixtures containing biodiesel oil, glycerol, glycerol soluble compounds, surfactants and additives. The fuel mixtures are uniform, remain suspended in solution, and are resistant to phase separation. Upon combustion, the mixtures generate reduced CO, $CO_2$, SOx, NOx and particulate matter emissions compared to petroleum fuels and offer improved engine performance over petroleum and water mixtures.

19 Claims, 7 Drawing Sheets

Related U.S. Application Data

(60) Provisional application No. 61/993,669, filed on May 15, 2014.

(51) Int. Cl.

| | |
|---|---|
| *C10L 10/14* | (2006.01) |
| *C10L 1/12* | (2006.01) |
| *C10L 10/08* | (2006.01) |
| *C10L 10/02* | (2006.01) |
| *F02M 25/00* | (2006.01) |
| *C10L 1/182* | (2006.01) |
| *C10L 1/19* | (2006.01) |
| *C10L 1/185* | (2006.01) |
| *C10L 1/198* | (2006.01) |
| *C10L 1/228* | (2006.01) |
| *C10L 1/23* | (2006.01) |

(52) U.S. Cl.
CPC ............. *C10L 10/08* (2013.01); *C10L 10/14* (2013.01); *F02M 25/00* (2013.01); C10L 1/125 (2013.01); C10L 1/1811 (2013.01); C10L 1/1824 (2013.01); C10L 1/1826 (2013.01); C10L 1/1852 (2013.01); C10L 1/191 (2013.01); C10L 1/1915 (2013.01); C10L 1/1985 (2013.01); C10L 1/2286 (2013.01); C10L 1/231 (2013.01); C10L 2200/0469 (2013.01); C10L 2200/0476 (2013.01); C10L 2230/22 (2013.01); C10L 2250/06 (2013.01); C10L 2250/084 (2013.01); C10L 2270/026 (2013.01)

(58) Field of Classification Search
CPC ........ C10L 1/191; C10L 1/1915; C10L 1/125; C10L 2200/0476; C10L 2250/084; C10L 2270/026; C10L 1/18; C10L 2250/06; C10L 1/1811; C10L 1/1824; C10L 1/1852; C10L 1/1985; C10L 1/2286; C10L 1/231; C10L 2200/0469; C10L 2230/22; F02M 25/00

See application file for complete search history.

(56) References Cited

U.S. PATENT DOCUMENTS

| | | | |
|---|---|---|---|
| 5,000,757 | A | 3/1991 | Puttock et al. |
| 5,437,693 | A | 8/1995 | Iizuka et al. |
| 6,113,661 | A | 9/2000 | Germanaud et al. |
| 6,638,323 | B2 | 10/2003 | Tsai et al. |
| 7,276,093 | B1 | 10/2007 | Rivas et al. |
| 8,679,202 | B2 | 3/2014 | Eaton et al. |
| 9,410,102 | B2 | 8/2016 | Eaton et al. |
| 2001/0005955 | A1 | 7/2001 | Langer et al. |
| 2005/0060928 | A1 | 3/2005 | Oldfield et al. |
| 2006/0048443 | A1 | 3/2006 | Filippini et al. |
| 2007/0033862 | A1 | 2/2007 | Olliges |
| 2008/0110083 | A1 | 5/2008 | Baehr et al. |
| 2008/0153143 | A1 | 6/2008 | Schorken et al. |
| 2010/0037513 | A1 | 2/2010 | Petrucci et al. |
| 2010/0234257 | A1 | 9/2010 | Martin |
| 2011/0056120 | A1 | 3/2011 | Teo |
| 2013/0019522 | A1 | 1/2013 | Eaton et al. |

OTHER PUBLICATIONS

Abeynaike et al., "The experimental measurement and modelling of sedimentation and creaming for glycerol/biodiesel droplet dispersions," Chemical Engineering Science, 79:125-137 (2012).

Day et al., "(E)mission impossible,?" tce the chemical engineer, 839:33-35 (May 2011).

Eaton et al., "Formulation and Combustion of Glycerol-Diesel Fuel Emulsions," Energy Fuels, 28:3940-3947 (2014).

Fernando et al., "Glycerol based automotive fuels from future biorefineries," Fuel, 86:2806-2809 (2007).

Striagas et al., "Processing of the glycerol fraction from biodiesel production plants to provide new fuels for heat generation," Energetika, T.54 Nr. 3, pp. 5-12 (2008).

International Search Report dated Aug. 5, 2015, from PCT/US15/30967.

International Search Report dated Jun. 2, 2013, from PCT/IB2012/002086.

\* cited by examiner

BIODIESEL GLYCEROL EMULSION FUEL MIXTURES

RELATED APPLICATIONS

This application is a continuation of U.S. patent application Ser. No. 14/713,585, filed May 15, 2015, which claims the benefit of priority to U.S. Provisional Patent Application Ser. No. 61/993,669, filed May 15, 2014, the contents of both of which are hereby incorporated by reference.

BACKGROUND

Field

In certain embodiments, the invention relates to renewable, cost-effective and low emission fuels, including those used in heating power generation, and transportation.

Summary of the Related Art

Combustion of petroleum based fuels (fossil fuels) contribute to increased levels of carbon dioxide ($CO_2$), carbon monoxide (CO), particulate matter (PM), nitrogen oxides (NOx), sulfur oxides (SOx) and other emissions in the earth's environment, which cause respiratory health effects, illnesses and contribute to climate change. Globally, major initiatives are underway to regulate power and transportation emissions using a combination of fuel quality controls, combustion aftertreatment requirements, and consumption mandates. Limiting sulfur content in petroleum fuels has helped to reduce particulate and acid rain causing pollutants, but results in poor fuel lubricity and increased fuel costs, thereby placing a greater operational demand on the end user. Alternative fuels, such as biodiesel, are attractive because they are inherently low in sulfur and reduce PM, CO and hydrocarbon (HC) emissions compared to low-sulfur diesel. These fuels typically contain heteroatoms, such as oxygen, which increases fuel lubricity extending equipment lifetimes.

Biodiesel is typically derived from renewable feedstock; for example, plants, animal fat, microorganisms, or other organisms, that have either fatty acid or lipid (triglyceride) structures. The feedstock are commonly converted into long-chain (fatty) methyl- or ethyl-esters for use in heat, power and transportation applications. Biodiesel can be used as a stand-alone fuel or as a blend with petroleum-based fuels. A common designation for these types of fuel blends is BX, where X is between 0-100 and represents the percent volume of biodiesel in the mixture.

As a comparison, hydrocarbon fuels derived from petroleum are compounds that do not contain oxygen and are non-polar. Biodiesel fuels contain oxygen functional groups, alkyl esters, which are polar. Biodiesel contains only trace amounts of sulfur and aromatic molecules, whereas many petroleum fuels contain significant amounts of sulfur and aromatic molecules. Resulting physical and chemical properties of a hydrocarbon are largely determined by the presence of oxygen, sulfur, aromatic functional groups, and polar functional groups. Therefore, petroleum derived fuels typically are low in specific gravity, are energy dense, have low flash points and exhibit low viscosity. Biodiesel, and its blends with petroleum fuels, exhibit higher specific gravity, lower energy density, higher flash points and increased viscosity. A summary of the differences between biodiesel and petroleum distillate fuel properties can be found in Table I. Because biodiesel and petroleum fuels have different physicochemical properties, fuel handling system materials are often incompatible. For example, accelerated degradation of naturalized rubber hose-liners and gaskets has been documented while utilizing biodiesel.

TABLE I

Comparison of the physical and chemical properties of biodiesel with #2 petroleum distillates demonstrating the unique characteristics of biodiesel.

| Property | Test Method | #2 Petroleum Distillates | Biodiesel |
| --- | --- | --- | --- |
| Heating Value (MJ/kg) | ASTM D240 | 46-48 | 40-42 |
| Carbon Number (mol-C/mol) | N/A | 8-22 | 18-25 |
| Oxygen:Carbon Ratio (mol/mol) | ASTM D5291 | 0 | ~0.11 |
| Hydrogen:Carbon Ratio (mol/mol) | ASTM D5291 | ~1.8 | ~1.9 |
| Flash Point (° C.) | ASTM D93 | <73 | 100-170 |
| Cetane Number (Rating) | ASTM D975 | 40-55 | 48-65 |
| Autoignition Temperature (° C.) | ASTM E659 | ~315 | ~150 |
| Molecular Weight (Ave.) (kg/kMol) | N/A | ~200 | 270-300 |
| Kinematic Viscosity @ 40° C. (cSt.) | ASTM D445 | 1-3 | 3-5 |
| Specific Gravity @ 25° C. | ASTM D1298 | ~0.84 | ~0.88 |
| Aromatics (wt./wt.) | ASTM D6591 | <35 | 0 |

As biodiesel is harvested from living organisms the net carbon foot print is below that of petroleum-based fuels when combusted. Biodiesels, however, offer poor cold weather performance and reduced shelf-life resulting from crystallization and oxidation processes, respectively. As such, biodiesel can benefit from additives or chemical modifications to increase fuel shelf-life, and improve cold weather performance. Oxidation is the primary ageing mechanism of biodiesel, especially the transformation of the unsaturated fatty acid esters inherent in the biodiesel. Saturating the fatty acids by hydrogenation can increase storage stability and reduce oxidation rates; however, this adversely affects resulting cold weather performance as wax-like molecules are prone to crystalize and may block fuel filters. Similarly, metals such as zinc and copper within fuel handling components have been shown to increase the rates of oxidation contributing to fuel aging concerns. Biodiesel additives have been developed to minimize these concerns. Typical storage additives are anti-oxidants, such as tert-butylhydroquinone (THBQ) or butylated hydroxyanisole (BHA), which increase shelf-life. Cold weather additives, such as neopentilglycol and trimethylol propane fatty esters, reduce crystallization temperatures of the fatty esters and can extend the operational temperatures of the fuels.

The combustion of biodiesel (B100) has been studied for its environmental benefits compare to petroleum-based diesels. The U.S. EPA, as defined by the Renewable Fuel Standard, has determined that the net reduction in greenhouse gas emissions from vegetable based biodiesel is approximately 50% on a life-cycle basis. Further, reductions in HC emissions have been reported as high as 67%, accompanied by reductions in CO and PM of approximately 50%. Conversely, NOx emissions are reported to increase by as much as 10%. Since NOx is a known contributor to smog and ground level ozone, methods to reduce the formation of NOx during combustion is desirable. Emulsification of water in biodiesel has been demonstrated to incrementally reduce NOx emissions associated with biodiesel combustion. Water, in amounts up to 20% (vol/vol) of the overall mixture, can either be stabilized in the fuel at the point of storage using surfactants or can be introduced at the point of consumption. Using this method, NOx and PM reductions are reduced to levels below either stand-alone petroleum or biodiesel combustion. Utilization of water, however, reduces the energy density of the fuel mixture since water does not participate in the combustion process. Further, water can accelerate corrosion of low-carbon steels if not used or stored appropriately. Alternatively, NOx- and PM-reducing fuel components are desirable.

Glycerol, also called glycerin or glycerine, has the formal chemical name of 1,2,3-propanetriol and is demonstrated to reduce unwanted emissions during combustion processes. Glycerol is commonly produced from renewable, vegetable-based, feedstock. In biodiesel manufacturing, the glycerol is often considered a low-value co-product that ends up in the aqueous processing streams and is either burned directly for process heat or is upgraded and sold into the commodities markets. In order to make glycerol accessible for most power and transportation applications, it must be introduced as a fuel mixture in the form of an emulsion.

Glycerol emulsions have the ability to improve fuel handling properties compared to petroleum-based fuels, such as bulk fluid viscosity and lubricity. Compared to water emulsion fuels, glycerol emulsion fuels offer high bulk fuel energy density (MJ/kg) while reducing emission of NOx and PM. Further, glycerol is compatible with low-carbon steels making the fuel mixtures less corrosive to storage and fuel handling equipment.

Glycerol, however, is less volatile than both biodiesel and traditional petroleum-derived diesel fuel. This may have a detrimental effect on the combustion quality of some glycerol-containing fuel. Therefore, glycerol-soluble additives for combustion improvement, thinning or viscosity modification may be used to increase volatility and improve combustibility of glycerol in a fuel mixture. Examples include: low molecular weight alcohols, ethers, and other glycerol-soluble compounds that reduce glycerol density and improve volatility. Combustion improvers typically take the form of nitrates, nitriles, ethers, furans, and peroxides. Introduction of these agents reduce the rate of emissions of CO and unburned HC. These compounds typically have a carbon number less than 10 and in some instances have carbon numbers less than 5. A characteristic of these materials is that they typically have flash points below 90° C., and in some instances flash points below 60° C. They also can have boiling points below 120° C., and in some instances boiling points below 90° C.

Glycerol emulsion fuels have been demonstrated utilizing petroleum-based distillates. Cognis Corporation described a fuel mixture comprised of liquid petroleum products in the range of 90% and 99% (vol/vol) and glycerol between 1% and 10% (vol/vol) [U.S. Published Patent Application Publication No. US20080110083, hereby incorporated by reference in its entirety]. Other references have described fuel mixtures containing glycerol for various other applications [See EP1434834B1, EP1950273A1, US20130133245, each of which is hereby incorporated by reference in its entirety].

BRIEF SUMMARY

In certain embodiments, the invention relates to formulation of fuel mixtures that contain glycerol, with or without glycerol-soluble compounds, emulsified within a base-fuel comprising biodiesel. In certain embodiments, the invention provides fuel mixtures comprising glycerol and biodiesel; these fuel mixtures reduce unwanted combustion emissions and improve emulsion fuel handling properties. In certain embodiments, the invention provides fuel mixtures containing glycerol that are resistant to phase separation for extended periods of time. In certain embodiments, the invention provides reductions in combustion emissions and substantially greater range of operating conditions when compared to water-fuel emulsion mixtures because of higher resultant energy density.

In certain embodiments, the fuel mixtures according to the invention provide an important improvement over the related art because the fuel mixtures according to this invention use renewable glycerol and biodiesel fuel components to significantly reduce regulated and greenhouse gas emissions, and are resistant to phase separation for extended periods of time and thus do not have to be produced immediately prior to consumption.

In a first aspect, the invention provides a fuel mixture comprising a fuel selected from the group consisting of 100% biodiesel (B100), any mixture of biodiesel and various petroleum diesel oils and heating oil (No. 2), no matter the fuel sources or additives, all collectively hereinafter referred to as "biodiesel blend stock"; glycerol and glycerol soluble compounds; with or without surfactants; and with or without additives for fuel property modification; wherein the mixture resists phase separation.

In certain embodiments, an object of the invention is to provide a fuel mixture that has viscosity and heat content properties that are suitable for use in existing or new engines, but which, upon combustion, produces lower emissions of carbon monoxide (CO), sulfur dioxide ($SO_2$), nitrous oxides (NOx), carbon dioxide ($CO_2$) and particulate matter (PM) and greenhouse gases than conventional fuels and biodiesels that currently are used to power engines or boilers. In certain embodiments, these fuel mixtures are expected to reduce engine wear compared to low-sulfur petroleum-based fuels. Glycerol/water mixtures have been used as antifreeze for many applications. Cold weather fuel properties that include cloud point, viscosity, and flow characteristics of an emulsified glycerol biodiesel based fuel are expected to be superior to those properties of pure biodiesel or a biodiesel petroleum diesel blend.

DETAILED DESCRIPTION

Overview

Figure 1:
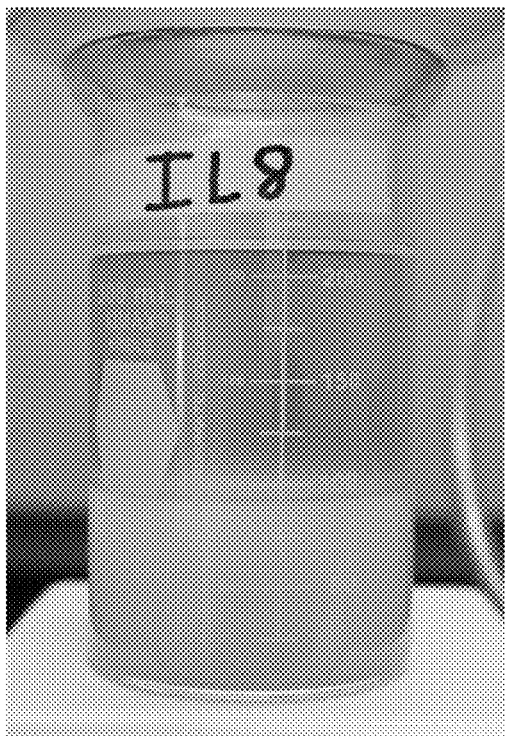
FIG. 1: Photograph of fuel mixture settling after three days at 25 degrees Celsius. The fuel mixture was comprised of canola oil derived biodiesel, 99% pure glycerol, and surfactant.

In certain embodiments, the invention relates to fuel mixtures containing glycerol for consumption in heating, power and transportation applications. In certain embodiments, the invention provides fuel mixtures containing biorenewable fuel sources containing glycerol that resist phase separation for extended periods of time. In certain embodiments, the invention provides combustion emission reductions and higher fuel energy density when compared to water-fuel emulsion mixtures.

In certain embodiments, the fuel mixtures according to the invention provide an important improvement over the related art because the fuel mixtures according to the invention use a biodiesel blend stock and are resistant to phase separation for extended periods of time. For the purposes of this invention description, fuel selected from the group consisting of 100% biodiesel, any mixture of biodiesel and various petroleum diesel oils and heating oil (No. 2), no matter the fuel sources or additives, are all collectively hereinafter referred to as "biodiesel blend stock." Biodiesel is derived from sources such as, but not limited to, soybean oil, waste fryer oils, animal fats, and various types of algae. As the combustion of biodiesel and glycerol does not create a net increase in atmospheric $CO_2$ they are classified as carbon neutral fuels.

Biodiesel is chemically differentiated from petroleum-based materials in numerous ways. Petroleum distillates contain over three hundred molecular species comprised of paraffin, iso-paraffin, olefin, naphthalenes, and mono- and poly-aromatics type compounds. The resulting hydrocarbon mixture covers a broad range of molecular weights and contain trace oxygenates. Alternatively, biodiesel is typically comprised of only a few dozen straight chain methyl- or ethyl-esters in a relatively narrow molecular weight range. In instances where biodiesel is derived from virgin vegetable oil sources, the number of chemical species may be less than 5. Further, biodiesel contains between 10% and 12% (wt/wt) oxygen exclusively as esters. The unique characteristics of biodiesel therefore makes emulsification of glycerol meaningfully and distinctly different compared to existing petroleum-based knowledge. As an example, polarity of long-chain esters found in biodiesel can offer surfactant properties when blended in petroleum products by preferentially adsorbing along glycerol droplet interfaces. Therefore, special considerations are required.

In certain embodiments, the invention involves mixing additives, glycerol and glycerol soluble compounds, and a base-fuel (biodiesel or its mixtures with petroleum distillates) to achieve an emulsified fuel. The resulting fuel mixture maintains dispersion of the glycerol in the base fuel for extended periods of time, reduces engine emissions and offers engine-compatible fuel properties for safe and efficient combustion applications.

In certain embodiments, the invention relates to a fuel mixture containing glycerol and biodiesel blend stocks that can achieve reduced combustion emissions and achieve desirable fuel handling properties related to viscosity, lubricity, cold flow performance, and corrosion. Fuel mixtures containing glycerol and biodiesel do not readily produce an emulsion and require stabilization of the dispersed glycerol droplets. The hydrophobic or polar component of biodiesel is a unique property compared with glycerol emulsions comprising non-polar hydrocarbons. Biodiesel's polar properties can improve the shelf-life, droplet size distribution, and other physical properties, as a result of the interaction of biodiesel with glycerol in the emulsions. Fuel mixtures described herein are shown to be resistant to phase separation and significantly reduced carbon foot print when compared to petroleum-based fuels. The fuel mixtures achieves these benefits while extending the operating range of power equipment by maintaining higher energy densities (MJ/kg) than equivalent water-emulsion fuels.

As used herein, the term "settling" is intended to mean the emulsified glycerol droplets distributed in the mixture aggregate to the bottom of their container when the fuel mixture is allowed to stand undisturbed over a period of time. Depending on the formulation of the fuel mixture, emulsification technique and environmental factors, such as temperature, fuel emulsion settling times can vary from minutes to months. In certain embodiments, during the normal settling process for the invention, a free layer of glycerol is not observed. The formation of a free layer of glycerol would indicate phase separation has occurred. Mixing or other physical agitation disperses the glycerol droplets back into the bulk fuel, demonstrating that the emulsion is still intact.

In certain embodiments, an object of the invention is to provide a fuel mixture that has viscosity, energy density, and cold flow properties that are suitable for use in heat, power, and transportation applications, but which, upon combustion, produces lower emissions of $SO_2$, NOx, CO, and PM; and; $CO_2$ and other greenhouse gases than conventional fuels.

In a first aspect, the invention provides a fuel mixture comprising biodiesel selected from the group consisting of 100% biodiesel (B100), any mixture of biodiesel and various petroleum diesel oils and heating oil (No. 2), no matter the fuel sources or additives; and glycerol; with or without glycerol soluble compounds; surfactants; and with or without additives; wherein the mixture resists phase separation.

In some embodiments, the mixture comprises from about 1% to about 99% biodiesel (vol/vol).

In some embodiments, the mixture comprises from about 1% to about 99% glycerol (vol/vol). Most commercially available glycerol preparations contain certain amounts of glycerol-soluble compounds, such as salts, methanol and water. It is preferred that these contaminants be present in the glycerol in such low quantities as to limit the total concentration of the contaminants in the fuel mixture to controlled levels.

To improve the combustion properties of the glycerol and biodiesel emulsion fuel mixture, combustion improvers may be added to the fuel as either biodiesel-soluble or glycerol-soluble compounds for the reduction of CO and unburned HC emissions. In some embodiments, the mixture comprises a combustion improver(s). In some embodiments, the combustion improver is selected from ethers, peroxides, nitriles, nitrates and mixtures thereof, but not limited to these improvers. In some embodiments, the glycerol and biodiesel emulsion fuel mixture contains combustion improvers in the amounts of about 0.1% (vol/vol) to about 10% (vol/vol).

To improve the cold flow properties of the glycerol and biodiesel emulsion, in certain embodiments, glycerol soluble compounds may be added for the reduction of glycerol droplet density and viscosity. In some embodiments, the mixture contains glycerol-soluble compounds selected from, but not limited to, water, low molecular weight alcohols such as methanol, ethanol, tert-butyl alcohol, and glycols such as ethylene glycol. In some embodiments, the mixture contains glycerol soluble compounds in the amounts of about 1% (vol/vol) to about 30% (vol/vol) of the fuel mixture.

The uniformity of the fuel mixture is determined in part by controlling the size of the glycerol droplets emulsified within the base fuel. Controlling the size of the glycerol droplets is also useful to allow the glycerol droplets to pass through the fuel filters, which generally have a particle size cutoff of about 2-30 μm. In some embodiments, the glycerol has droplet sizes of from about 0.1 μm to about 100 μm. In some embodiments, the glycerol has droplet sizes of from about 0.1 μm to about 50 μm.

In certain embodiments, the uniformity of the fuel mixture can be further improved by the addition of one or more surfactants to the fuel mixture. In some embodiments, the mixture comprises from about 0.1% to about 5% surfactant (wt/wt). In some embodiments, the surfactant is selected from, but not limited to, the group consisting of one or more of polyethylene glycol, polyoxyethylene, glycerides, polyglycerols, sorbitan glycosides, esters and acids, or mixtures thereof.

In some instances, the viscosity of the fuel mixture may be increased by adding viscosity enhancers to the biodiesel phase before emulsification with the glycerol phase. Such viscosity enhancers include, without limitation, resins, resin acids, polyureas, nitroesters, polyolefins, elastomers, and mixtures thereof.

As discussed above, in certain embodiments, it is an object of the invention to provide a fuel mixture that, when combusted, produces lower emissions of $SO_2$, NOx, CO, and PM and $CO_2$ and other GHGs than conventional fuels used to power engines. In some embodiments, the mixture, when created, contains less than about 0.1% by mass (wt/wt) elemental sulfur. Combustion of biodiesel compared to petroleum-based diesel fuel produces a higher concentration of NOx under similar conditions. In certain embodiments, this invention, when combusted reduces NOx compared to biodiesel with minimal reduction in power output. In some embodiments, NOx emissions are reduced from about 0.1% to about 25% on a gm/(kW-hr) basis.

These reduced emissions can be achieved by using a fuel mixture that incorporates water as an emulsion. However, such fuel mixtures have poor cold flow properties and reduce the fuels energy density.

As discussed above, in certain embodiments, a significant advantage of the embodiments of the fuel mixture according to the invention is that it resists phase separation for extended periods of time. In some embodiments, the fuel mixture resists phase separation for 24 hours at 25° C. and 50-75% relative humidity. In some embodiments, the fuel mixture resists phase separation for over 6 months at 25° C. and 50-75% relative humidity.

In certain embodiments, another advantage of the fuel mixture according to the invention is it expected to have superior cold weather performance when compared with biodiesel (B100) or its blends with petroleum-based fuels. For example biodiesel based on coconut oil and palm oil exhibits pour points of −6° C. and +12° C., respectively. The emulsification of glycerol into a B100 fuel produces mixtures having pour points between about −30° C. and about +10° C. In certain embodiments, the invention provides emulsions with pour points improved by from about 5° C. to about 20° C., for example, pour points improved by about 20° C., improved by about 15° C., improved by about 10° C., or improved by about 5° C. improved by about 20° C., improved by about 15° C., improved by about 10° C., or improved by about 5° C., as compared to the pour point of the B100 or its blends with petroleum-based fuels.

In certain embodiments, the invention relates to fuel mixtures comprising biodiesel and glycerol. Fuel mixtures comprising glycerol are described in U.S. Pat. No. 8,679,202, which is hereby incorporated by reference in its entirety.

Exemplary Fuel Mixtures

In certain embodiments, the invention relates to a fuel mixture emulsion, wherein the fuel mixture comprises:
(a) a fuel, wherein the fuel comprises a biodiesel; and
(b) glycerol and water, wherein water is present in an amount less than about 30% (wt/wt) of the glycerol,
wherein either (i) the fuel comprises a plurality of droplets substantially evenly dispersed in the glycerol and water, or (ii) the glycerol and water comprise a plurality of droplets substantially evenly dispersed in the fuel.

In certain embodiments, the invention relates to any one of the fuel mixtures described herein, wherein water is present in an amount less than about 25% (wt/wt) of the glycerol. In certain embodiments, the invention relates to any one of the fuel mixtures described herein, wherein water is present in an amount from about 0% to about 25% (wt/wt) of the glycerol. In certain embodiments, the invention relates to any one of the fuel mixtures described herein, wherein water is present is an amount of about 26%, about 24%, about 22%, about 20%, about 18%, about 16%, about 14%, about 12%, about 10%, about 8%, about 6%, about 4%, about 2%, or about 0% (wt/wt) of the glycerol.

In certain embodiments, the invention relates to any one of the fuel mixtures described herein, wherein the fuel is 100% biodiesel (B100), a mixture of biodiesel and a petroleum diesel oil, a mixture of biodiesel and a heating oil, or a mixture of biodiesel, a petroleum diesel oil, and a heating oil.

In certain embodiments, the invention relates to any one of the fuel mixtures described herein, wherein the fuel is 100% biodiesel (B100).

In certain embodiments, the invention relates to any one of the fuel mixtures described herein, wherein the mixture comprises from about 1% to about 99% fuel (vol/vol).

In certain embodiments, the invention relates to any one of the fuel mixtures described herein, wherein the mixture comprises from about 65% to about 99% fuel (vol/vol).

In certain embodiments, the invention relates to any one of the fuel mixtures described herein, wherein the mixture comprises from about 40% to about 65% fuel (vol/vol).

In certain embodiments, the invention relates to any one of the fuel mixtures described herein, wherein the mixture comprises about 40%, about 42%, about 44%, about 46%, about 48%, about 50%, about 52%, about 54%, about 56%, about 58%, about 60%, about 62%, about 64%, or about 66% fuel (vol/vol).

In certain embodiments, the invention relates to any one of the fuel mixtures described herein, wherein the mixture comprises from about 1% to about 99% glycerol (vol/vol).

In certain embodiments, the invention relates to any one of the fuel mixtures described herein, wherein the mixture comprises from about 1% to about 35% glycerol (vol/vol).

In certain embodiments, the invention relates to any one of the fuel mixtures described herein, wherein the mixture comprises from about 35% to about 60% glycerol (vol/vol).

In certain embodiments, the invention relates to any one of the fuel mixtures described herein, wherein the mixture comprises about 34%, about 36%, about 38%, about 40%, about 42%, about 44%, about 46%, about 48%, about 50%, about 52%, about 54%, about 56%, about 58%, or about 60% glycerol (vol/vol).

In certain embodiments, the invention relates to any one of the fuel mixtures described herein, wherein the fuel mixture further comprises a combustion improver.

In certain embodiments, the invention relates to any one of the fuel mixtures described herein, wherein the combustion improver is selected from the group consisting of nitrates, nitriles, ethers, and peroxides, and mixtures thereof.

In certain embodiments, the invention relates to any one of the fuel mixtures described herein, wherein the mixture comprises the combustion improver in an amount from about 0.1% to about 10% (vol/vol). In certain embodiments, the invention relates to any one of the fuel mixtures described herein, wherein the mixture comprises the combustion improver in an amount of about 0.1%, about 1%, about 2%, about 3%, about 4%, about 5%, about 6%, about 7%, about 8%, about 9%, or about 10% (vol/vol).

In certain embodiments, the invention relates to any one of the fuel mixtures described herein, wherein the droplets further comprise an alcohol.

In certain embodiments, the invention relates to any one of the fuel mixtures described herein, wherein the alcohol is present in an amount of from about 0.1% to about 10% (vol/vol) of the glycerol. In certain embodiments, the invention relates to any one of the fuel mixtures described herein, wherein the alcohol is present in an amount of about 0.1%, about 1%, about 2%, about 3%, about 4%, about 5%, about 6%, about 7%, about 8%, about 9%, or about 10% (vol/vol) of the glycerol.

In certain embodiments, the invention relates to any one of the fuel mixtures described herein, wherein the alcohol has less than 5 carbon atoms per molecule.

In certain embodiments, the invention relates to any one of the fuel mixtures described herein, wherein the mixture further comprises a surfactant.

In certain embodiments, the invention relates to any one of the fuel mixtures described herein, wherein the surfactant is selected from the group consisting of a polyethylene glycol, a polyoxyethylene, a glyceride, a polyglycerol, a sorbitan glycoside, an ester, and an acid, and mixtures thereof.

In certain embodiments, the invention relates to any one of the fuel mixtures described herein, further comprising a viscosity enhancer selected from the group consisting of a resin, a resin acid, a polyurea, a nitroester, a polyolefin, and an elastomer, and mixtures thereof.

In certain embodiments, the invention relates to any one of the fuel mixtures described herein, wherein the mixture contains less than about 0.1% by mass elemental sulfur.

In certain embodiments, the invention relates to any one of the fuel mixtures described herein, wherein the mixture resists phase separation for 24 hours at 25° C. with relative humidity between 50-75%.

In certain embodiments, the invention relates to any one of the fuel mixtures described herein, wherein the mixture exhibits improved cloud point or improved cold flow characteristics when compared with biodiesel.

In certain embodiments, the invention relates to any one of the fuel mixtures described herein, wherein the mixture exhibits improved cloud point or improved cold flow characteristics when compared with biodiesel/petroleum diesel blends.

In certain embodiments, the invention relates to any one of the fuel mixtures described herein, further comprising an antioxidant.

In certain embodiments, the invention relates to any one of the fuel mixtures described herein, wherein the antioxidant is present in an amount of from about 0.1% to about 5% (vol/vol) of the mixture. In certain embodiments, the invention relates to any one of the fuel mixtures described herein, wherein the antioxidant is present in an amount of about 0.1%, about 1%, about 2%, about 3%, about 4%, or about 5% (vol/vol) of the mixture.

In certain embodiments, the invention relates to any one of the fuel mixtures described herein, wherein the droplets have diameters of from about 100 nm to about 50 micrometers. In certain embodiments, the invention relates to any one of the fuel mixtures described herein, wherein the droplets have diameters of from about 100 nm to about 10 micrometers. In certain embodiments, the invention relates to any one of the fuel mixtures described herein, wherein the droplets have diameters of about 100 nm, about 200 nm, about 300 nm, about 400 nm, about 500 nm, about 600 nm, about 700 nm, about 800 nm, about 900 nm, about 1 µm, about 2 µm, about 3 µm, about 4 µm, about 5 µm, about 6 µm, about 7 µm, about 8 µm, about 9 µm, or about 10 µm.

In certain embodiments, the invention relates to any one of the fuel mixtures described herein, wherein the average diameter of the droplets is from about 100 nm to about 50 micrometers, as determined by dynamic light scattering. In certain embodiments, the invention relates to any one of the fuel mixtures described herein, wherein the average diameter of the droplets is from about 100 nm to about 10 micrometers, as determined by dynamic light scattering. In certain embodiments, the invention relates to any one of the fuel mixtures described herein, wherein the droplets have diameters of about 100 nm, about 200 nm, about 300 nm, about 400 nm, about 500 nm, about 600 nm, about 700 nm, about 800 nm, about 900 nm, about 1 µm, about 2 µm, about 3 µm, about 4 µm, about 5 µm, about 6 µm, about 7 µm, about 8 µm, about 9 µm, or about 10 µm, as determined by dynamic light scattering.

In certain embodiments, the invention relates to a fuel mixture, wherein the fuel mixture consists essentially of:
(a) a fuel, wherein the fuel consists essentially of a biodiesel and an ultra-low sulfur diesel;
(b) glycerol and water, wherein water is present in an amount less than about 30% (wt/wt) of the glycerol; and
(c) a surfactant or a mixture of surfactants,
wherein either (i) the fuel is present as a plurality of droplets substantially evenly dispersed in the glycerol and water, or (ii) the glycerol and water are present as a plurality of droplets substantially evenly dispersed in the fuel.

In certain embodiments, the invention relates to any one of the fuel mixtures described herein, wherein water is present in an amount less than about 25% (wt/wt) of the glycerol. In certain embodiments, the invention relates to any one of the fuel mixtures described herein, wherein water is present in an amount from about 0.1% to about 25% (wt/wt) of the glycerol. In certain embodiments, the invention relates to any one of the fuel mixtures described herein, wherein water is present is an amount of about 26%, about 24%, about 22%, about 20%, about 18%, about 16%, about 14%, about 12%, about 10%, about 8%, about 6%, about 4%, about 2%, or about 0.1% (wt/wt) of the glycerol.

In certain embodiments, the invention relates to a fuel mixture, wherein the fuel mixture consists essentially of:
(a) a fuel, wherein the fuel consists essentially of a biodiesel;

(b) glycerol and water, wherein water is present in an amount less than about 30% (wt/wt) of the glycerol; and (c) a surfactant or a mixture of surfactants, wherein either (i) the fuel is present as a plurality of droplets substantially evenly dispersed in the glycerol and water, or (ii) the glycerol and water are present as a plurality of droplets substantially evenly dispersed in the fuel.

In certain embodiments, the invention relates to any one of the fuel mixtures described herein, wherein water is present in an amount less than about 25% (wt/wt) of the glycerol. In certain embodiments, the invention relates to any one of the fuel mixtures described herein, wherein water is present in an amount from about 0.1% to about 25% (wt/wt) of the glycerol. In certain embodiments, the invention relates to any one of the fuel mixtures described herein, wherein water is present is an amount of about 26%, about 24%, about 22%, about 20%, about 18%, about 16%, about 14%, about 12%, about 10%, about 8%, about 6%, about 4%, about 2%, or about 0.1% (wt/wt) of the glycerol.

In certain embodiments, the invention relates to any one of the fuel mixtures described herein, wherein the fuel is present in an amount from about 1% to about 99% (vol/vol).

In certain embodiments, the invention relates to any one of the fuel mixtures described herein, wherein the fuel is present in an amount from about 65% to about 99% (vol/vol).

In certain embodiments, the invention relates to any one of the fuel mixtures described herein, wherein the fuel is present in an amount from about 40% to about 65% (vol/vol).

In certain embodiments, the invention relates to any one of the fuel mixtures described herein, wherein the fuel is present in an amount of about 40%, about 42%, about 44%, about 46%, about 48%, about 50%, about 52%, about 54%, about 56%, about 58%, about 60%, about 62%, about 64%, or about 66% fuel (vol/vol).

In certain embodiments, the invention relates to any one of the fuel mixtures described herein, wherein glycerol is present in an amount from about 10% to about 60% (vol/vol).

In certain embodiments, the invention relates to any one of the fuel mixtures described herein, wherein the glycerol is present in an amount of about 18%, about 20%, about 22%, about 24%, about 26%, about 28%, about 30%, about 32%, about 34%, about 36%, about 38%, about 40%, about 42%, about 44%, or about 46% (vol/vol).

In certain embodiments, the invention relates to any one of the fuel mixtures described herein, wherein the surfactant is a non-ionic surfactant.

In certain embodiments, the invention relates to any one of the fuel mixtures described herein, wherein the surfactant is selected from the group consisting of a polyethylene glycol, a polyoxyethylene, a glyceride, a polyglycerol, a sorbitan glycoside, an ester, and an acid, and mixtures thereof.

In certain embodiments, the invention relates to any one of the fuel mixtures described herein, wherein the mixture contains less than about 0.1% by mass elemental sulfur.

In certain embodiments, the invention relates to any one of the fuel mixtures described herein, wherein the mixture resists phase separation at 25° C. with relative humidity between 50-75%.

In certain embodiments, the invention relates to any one of the fuel mixtures described herein, wherein the mixture exhibits improved cloud point or improved cold flow characteristics when compared with biodiesel.

In certain embodiments, the invention relates to any one of the fuel mixtures described herein, wherein the mixture exhibits improved cloud point or improved cold flow characteristics when compared with biodiesel/petroleum diesel blends.

In certain embodiments, the invention relates to any one of the fuel mixtures described herein, wherein the droplets have diameters of from about 100 nm to about 50 micrometers. In certain embodiments, the invention relates to any one of the fuel mixtures described herein, wherein the droplets have diameters of from about 100 nm to about 10 micrometers. In certain embodiments, the invention relates to any one of the fuel mixtures described herein, wherein the droplets have diameters of about 100 nm, about 200 nm, about 300 nm, about 400 nm, about 500 nm, about 600 nm, about 700 nm, about 800 nm, about 900 nm, about 1 µm, about 2 µm, about 3 µm, about 4 µm, about 5 µm, about 6 µm, about 7 µm, about 8 µm, about 9 µm, or about 10 µm.

In certain embodiments, the invention relates to any one of the fuel mixtures described herein, wherein the average diameter of the droplets is from about 100 nm to about 50 micrometers, as determined by dynamic light scattering. In certain embodiments, the invention relates to any one of the fuel mixtures described herein, wherein the average diameter of the droplets is from about 100 nm to about 10 micrometers, as determined by dynamic light scattering. In certain embodiments, the invention relates to any one of the fuel mixtures described herein, wherein the droplets have diameters of about 100 nm, about 200 nm, about 300 nm, about 400 nm, about 500 nm, about 600 nm, about 700 nm, about 800 nm, about 900 nm, about 1 µm, about 2 µm, about 3 µm, about 4 µm, about 5 µm, about 6 µm, about 7 µm, about 8 µm, about 9 µm, or about 10 µm, as determined by dynamic light scattering.

Exemplary Methods

In certain embodiments, the invention relates to a method of powering or fueling an engine or boiler comprising combusting any of the fuel mixtures described herein. In certain embodiments, the invention relates to a method of powering or fueling an engine or boiler comprising combusting an effective amount of any of the fuel mixtures described herein.

In certain embodiments, the invention relates to any one of the methods described herein, wherein the method results in reduced wear in the engine or boiler as compared to the wear produced by combustion of the same amount of a petroleum product.

In certain embodiments, the invention relates to any one of the methods described herein, wherein the engine is an internal combustion engine.

In certain embodiments, the invention relates to any one of the methods described herein, wherein the engine is a diesel engine.

In certain embodiments, the invention relates to any one of the methods described herein, wherein the method results in lower emissions of carbon monoxide (CO), sulfur dioxide ($SO_2$), nitrous oxides (NOx), or carbon dioxide ($CO_2$), or reduced quantities of particulate matter (PM), as compared to a method of powering or fueling the engine or boiler with the same amount of a petroleum product.

EXEMPLIFICATION

The invention now being generally described, it will be more readily understood by reference to the following examples, which are included merely for purposes of illustration of certain aspects and embodiments of the invention, and are not intended to limit the invention.

Example 1

Demonstration of an Emulsion Fuel with Biodiesel (B100) Base Fuel, 99% Pure Glycerol and a Surfactant System that is Resistant to Phase Separation for Extended Periods of Time In a typical experiment, 50 mL of 99% pure glycerol was placed in a 300-mL wide-mouth beaker. The following components were then added to this beaker; 150 mL of 100% Biodiesel (B100) derived from food grade canola oil, 10 mL of distilled water, 0.5 mL sorbitan monooleate, 0.25 mL sorbitan trioleate, and 0.5 mL polyoxyethylenesorbitan monooleate. Using a handheld mixer, the fuel components were stirred for 60 seconds at approximately 1000 rpm. This mixing produced a macro-emulsion, where no free glycerol was observed. This intermediate macro-emulsion was then processed through a high pressure homogenizer. The resultant emulsified fuel was a light yellow in appearance with a viscosity of 7 cst. at 25 degrees Celsius. After standing undisturbed for 3 days at 25 degrees Celsius, settling was observed as shown in FIG. 1. After standing for 6 months no further settling was observed. No phase separation was observed during this time. The mixture was gently stirred by hand which redistributed the emulsified particles into the bulk fuel.

intermediate macro-emulsion was then processed through a high pressure homogenizer. The resultant emulsified fuel was a light orange cloudy mixture in appearance with a viscosity of 5.5 cst. and a density of 0.94 g mL$^{-1}$ at 40 degrees Celsius. The resulting glycerol concentration in the fuel mixture is 29% (vol/vol). Important fuel properties can be found in Tables II and III below that includes this fuel (F) and others produced by similar technique.

TABLE II

Mass-based composition of glycerol emulsion fuels used to compare and contrast fuel properties of traditional fuels to glycerol emulsion fuels.

| | Composition | | | | |
|---|---|---|---|---|---|
| Fuel | Diesel Mass % | Biodiesel Mass % | Glycerol Mass % | Water Mass % | Surfactant Mass % |
| A | 100 | — | — | — | — |
| B | — | 100 | — | — | — |
| C | 80 | 20 | — | — | — |
| D | 71.0 | 14.00 | 12.9 | 1.0 | 1.2 |
| E | 60.5 | 11.6 | 25.9 | 0.9 | 1.1 |
| F | 50.9 | 9.3 | 37.9 | 0.9 | 1.1 |
| G | 42.1 | 7.3 | 48.8 | 0.8 | 1.0 |

TABLE III

Pertinent physical and chemical fuel properties of glycerol emulsion fuels for fuels with composition described in Table II.

| Fuel | LHV kJ/kg | Hydrogen/Carbon Ratio | Oxygen/Carbon Ratio | Specific Gravity @ 40° C. kg/L | Kinematic Viscosity @ 40° C. cst. | Average Molecular Weight kg/kmol | Air/Fuel Ratio kg/kg |
|---|---|---|---|---|---|---|---|
| A | 44,300 | 2.13 | 0 | 0.82 | 2.3 | 228.8 | 14.69 |
| B | 39,000 | 1.88 | 0.12 | 0.84 | 4.4 | 270.7 | 12.17 |
| C | 43,240 | 2.08 | 0.02 | 0.82 | 2.5 | 236.2 | 14.19 |
| D | 39,243 | 2.14 | 0.09 | 0.84 | 2.8 | 180.4 | 12.90 |
| E | 35,684 | 2.19 | 0.17 | 0.94 | 3.7 | 156.7 | 11.73 |
| F | 32,434 | 2.24 | 0.25 | 0.94 | 5.5 | 140.0 | 10.66 |
| G | 29,456 | 2.29 | 0.34 | 0.98 | 9.5 | 127.5 | 9.68 |

Example 2

Figure 2:
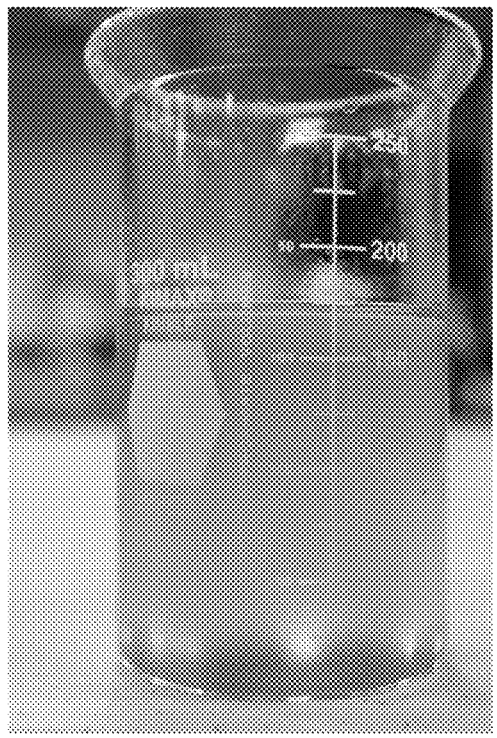
FIG. 2: Photograph of fuel mixture settling after 24 hours at 25 degrees Celsius. The fuel mixture was comprised of B20 biodiesel blend stock made of waste vegetable oil derived biodiesel and ultra-low sulfur diesel, 99% pure glycerol and surfactant.

Demonstration of an Emulsion Fuel with Biodiesel (B20) Base Fuel, 99% Pure Glycerol and a Surfactant System that is Resistant to Phase Separation for Extended Periods of Time In a typical experiment, 375 mL of 99% pure glycerol was placed in a 2-L flask. The following components were then added to this flask: 650 mL of B20 comprised of 20% (vol/vol) biodiesel produced from waste vegetable oils and 80% (vol/vol) ultra-low sulfur diesel, 10 mL of distilled water, 3.25 mL sorbitan monooleate, 2.5 mL sorbitan trioleate, and 2.25 mL polyoxyethylenesorbitan monooleate. Using a handheld mixer, the fuel components were stirred for 90 seconds at approximately 1000 rpm. This produced a macro-emulsion, where no free glycerol was observed. This A fuel mixture sample of 15 mL was removed from the container and placed in a 20-mL round bottom vial. The height of fuel mixture in the vial was recorded. At 30-minute intervals, the fuel mixture was monitored for settling by recording the distance from the free fuel mixture surface to the emulsion layer interface. This distance describes the cream layer of biodiesel blend stock. Results from this settling measurement are recorded in Table IV in which the fuel (29% vol.) is presented with fuel mixtures of varying glycerol content prepared by similar technique. The fuel had a cream layer thickness of 26 mm after 60 minutes which corresponds to an average glycerol droplet diameter of 38.45 micrometers when using the Stokes Equation. After standing undisturbed for 24 hours at 25 degrees Celsius, settling was observed in the fuel emulsion as shown in FIG. 2. However, no phase separation was observed. After standing for 3 weeks no further settling was observed and no signs of phase separation were observed. The mixture was gently stirred by hand which redistributed the emulsified particles into the bulk fuel.

TABLE IV

Glycerol droplet size data for fuels mixtures produced from B20 biodiesel blend stock with emulsified glycerol accounting for 19, 29, and 39% vol. of the fuel mixture.

| Glycerol Content in B20 Base Fuel Volume % | Settling Time Minutes | Setting Displacement mm | Droplet Velocity (Average) m/s | Droplet Diameter (Average) Micrometers |
|---|---|---|---|---|
| 19 | 14 | 24 | $2.85 * 10^{-5}$ | 80.9 |
|  | 40 | 30 | $3.85 * 10^{-6}$ | 29.7 |
|  |  |  | Average Diameter | 55.3 |
| 29 | 30 | 5 | $2.78 * 10^{-6}$ | 25.2 |
|  | 60 | 26 | $1.17 * 10^{-5}$ | 51.7 |
|  |  |  | Average Diameter | 38.45 |
| 39 | 30 | 5 | $2.78 * 10^{-6}$ | 25.2 |
|  | 60 | 20 | $8.33 * 10^{-6}$ | 43.7 |
|  |  |  | Average Diameter | 34.45 |

Figure 3:
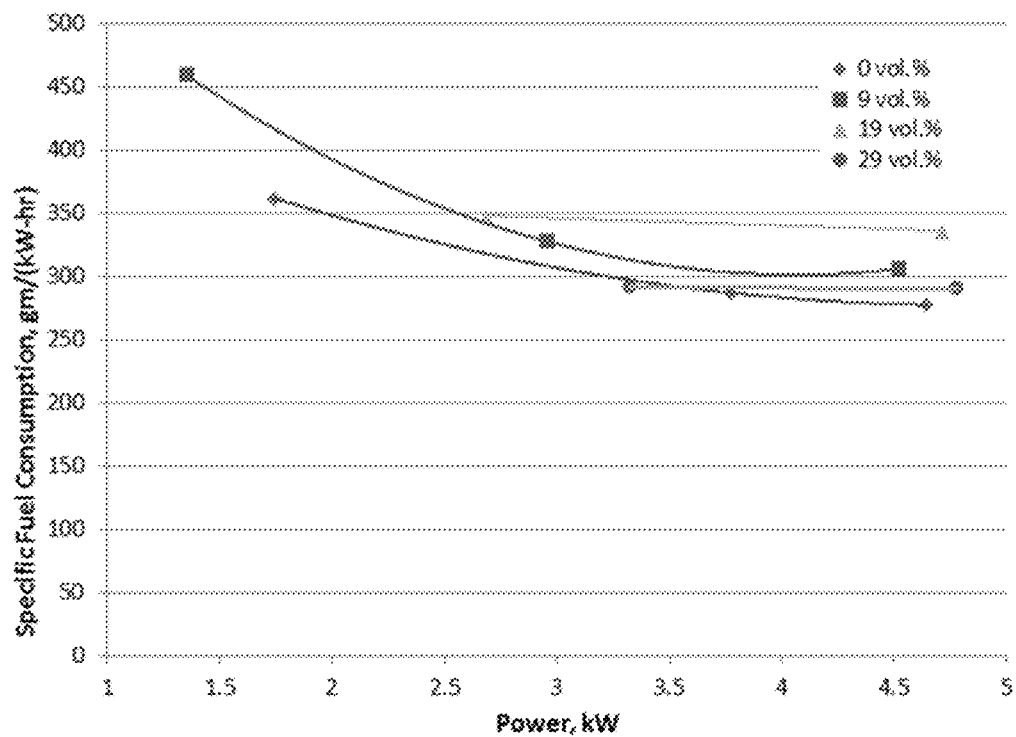
FIG. 3: Specific fuel consumption plotted as a function of engine power output for B20 fuels with 0, 9, 19 and 29% (vol/vol) of emulsified glycerol.
Figure 4:
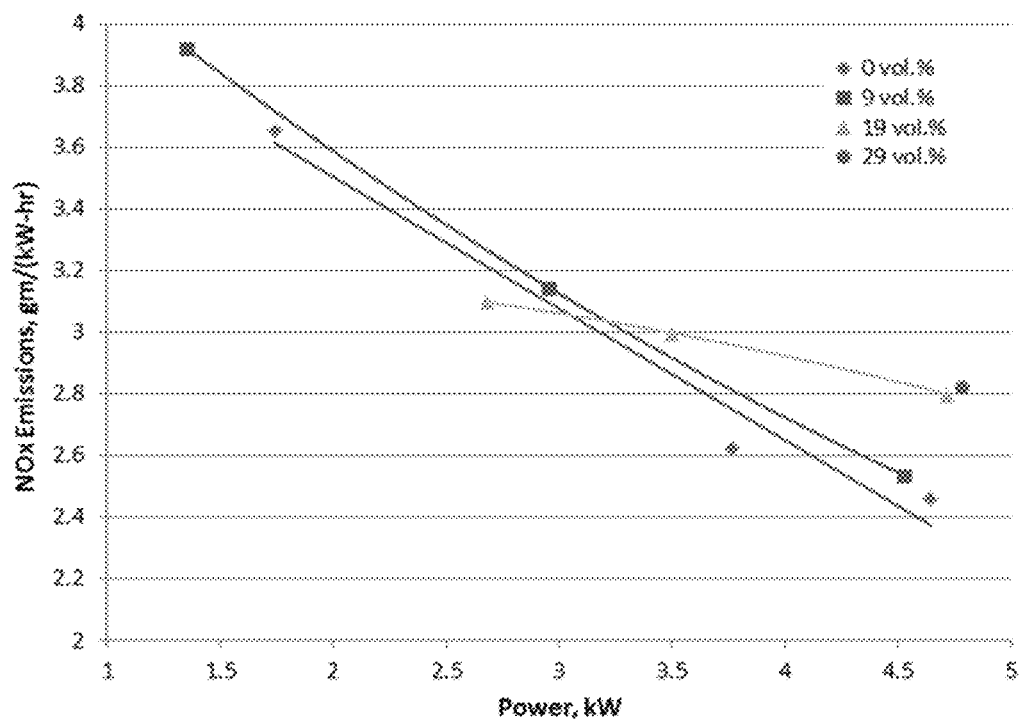
FIG. 4: NOx emissions plotted as a function of engine power output for B20 fuels with 0, 9, 19 and 29% (vol/vol) of emulsified glycerol.
Figure 5:
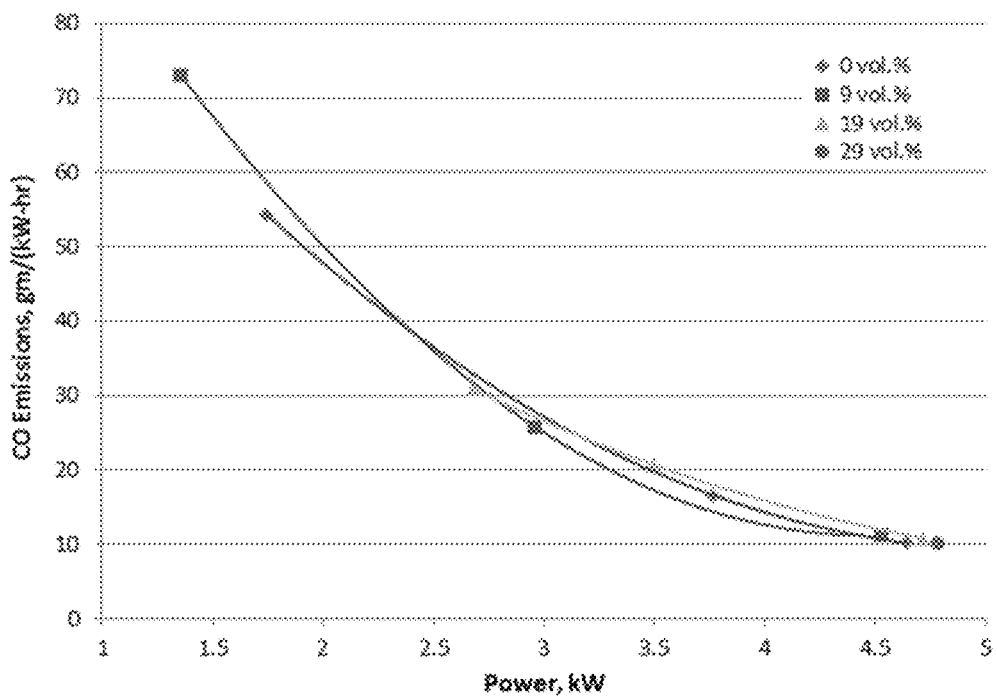
FIG. 5: Carbon monoxide emissions plotted as a function of engine power output for B20 fuels with 0, 9, 19 and 29% (vol/vol) of emulsified glycerol.

The fuel mixture was burned in a naturally-aspirated single-cylinder Hatz 1B30 diesel engine at a constant speed of 2,500 RPM over a load range from 1.5-5 kW. Engine specific emissions of $O_2$, $CO_2$, $NO_x$ and CO were monitored continuously. The engine has a displacement of 347 $cm^3$, compression ratio of 1:22 and bore and stroke of 80 and 69 mm, respectively. The fuel mixture when combusted produced specific fuel consumption within the range of 200-350 gm/(kW-hr) as described in FIG. 3. NOx emissions were consistently in the range of 2.8-3.2 gm/(kW-hr) as described in FIG. 4 and CO emissions were comparable to the B20 biodiesel blend stock as shown in FIG. 5.

Example 3

Figure 6:
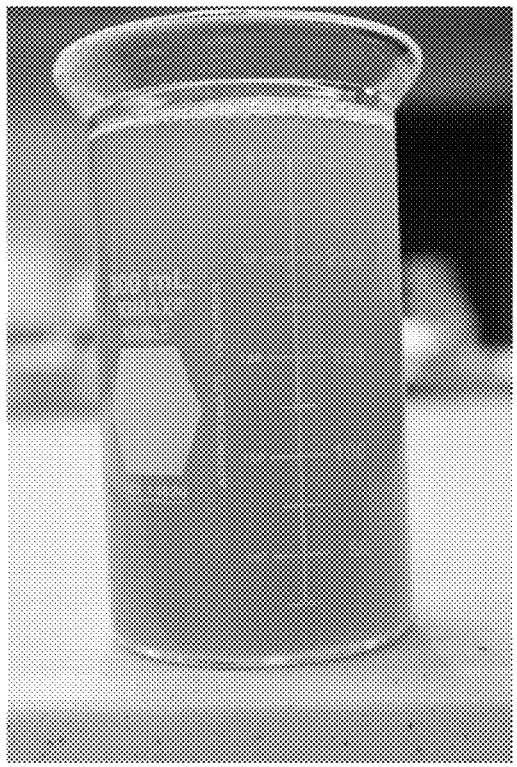
FIG. 6: Photograph of fuel mixture as prepared showing well dispersed emulsion system. The fuel mixture comprised of 175 mL B50 biodiesel blend stock, made of 50% (vol/vol) waste vegetable oil derived biodiesel and 50% (vol/vol) ultra-low sulfur diesel, 35% (vol/vol) 99% USP grade glycerol, and surfactant.

Demonstration of Emulsion Creation with Biodiesel (B50) Base Fuel, 99% Pure Glycerol and Surfactant System In a typical experiment, 90 mL of 99% pure glycerol was placed in a 300-mL beaker. The following components were then added to this beaker; 175 mL of B50 biodiesel blend stock, consisting of 50% (vol/vol) waste vegetable oil derived biodiesel and 50 vol. % ultra-low sulfur diesel, 0.25 mL sorbitan monooleate, 0.5 mL sorbitan trioleate, and 0.50 mL polyoxyethylenesorbitan monooleate. Using a handheld mixer, the fuel components were stirred for 60 seconds at approximately 1000 rpm. This produced a macro-emulsion, where no free glycerol was observed. This intermediate macro-emulsion was then processed through a high pressure homogenizer. The resultant emulsified fuel was a light orange cloudy mixture in appearance (FIG. 6) with a viscosity of 40 cst. at 40 degrees Celsius. After standing undisturbed for 24 hours at 25 degrees Celsius, settling was observed in the fuel emulsion. However, no phase separated glycerol was observed. After standing for 3 weeks, no further settling was observed and no signs of phase separation were observed. The mixture was gently stirred by hand which redistributed the emulsified particles into the bulk fuel.

Example 4

Figure 7:
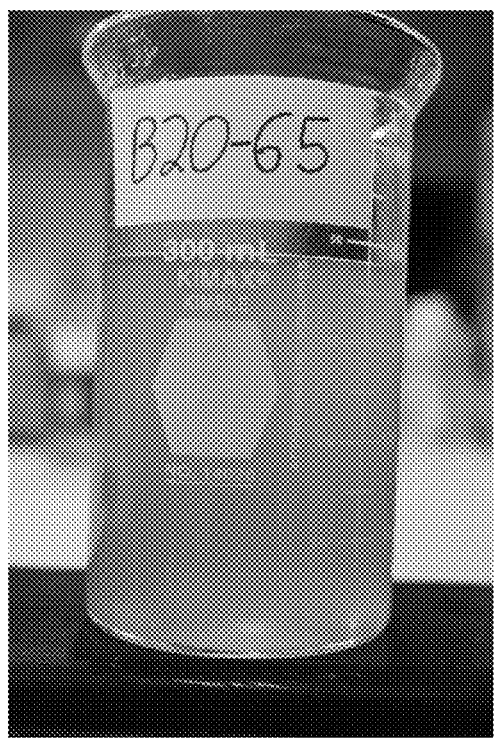
FIG. 7: Photograph of fuel mixture as prepared showing well dispersed emulsion system. The fuel mixture comprised of B20 biodiesel blend stock, made of 20% (vol/vol) waste vegetable oil derived biodiesel and 80% (vol/vol) ultra-low sulfur diesel, 36% (vol/vol) 99% USP grade glycerol, distilled water, combustion improver, and surfactant.

Demonstration of Emulsion Creation with Biodiesel (B20) Base Fuel, 99% Pure Glycerol, Combustion Improver and Surfactant System In a typical experiment, 94 mL of 99% pure glycerol was placed in a 300-mL beaker. The following components were then added to this beaker; 163 mL of B20 biodiesel blend stock, consisting of 20% (vol/vol) waste vegetable oil-derived biodiesel and 80% (vol/vol) ultra-low sulfur diesel, 0.2 mL 2-ethylhexyl nitrate, 2.50 mL distilled water, 0.50 mL sorbitan monooleate, 0.50 mL sorbitan trioleate, and 0.50 mL polyoxyethylenesorbitan monooleate. Using a handheld mixer, the fuel components were stirred for 60 seconds at approximately 1000 rpm. This produced a macro-emulsion, where no free glycerol was observed. This intermediate macro-emulsion was then processed through a high pressure homogenizer. The resultant emulsified fuel was a light orange cloudy mixture in appearance as shown in FIG. 7 with a viscosity of 6.5 cst. at 40 degrees Celsius. After standing undisturbed for 24 hours at 25 degrees Celsius, settling was observed in the fuel emulsion. However, no phase separated glycerol was observed. The mixture was gently stirred by hand which redistributed the emulsified particles into the bulk fuel.

Example 5

Prophetic

In a typical experiment, 36.9 gallons of glycerol purified to 99% purity is placed in an 80-gallon steel kettle. 4.16 gallons of water and 1 gallon ethanol is then added to the kettle. This material is defined as the "secondary phase." Using an overhead propeller stirrer, the secondary phase material is stirred at 900 RPM for 90 seconds. In a second steel kettle, 225 gallons of biodiesel is added to a mixture comprised of 4.7 gallons sorbitan monooleate, 0.82 gallons sorbitan trioleate and 2.2 gallons polyoxyethylenesorbitan monooleate. This material is referred to as the "primary phase." The primary phase material is agitated using an overhead stirrer for 90 seconds at 900 RPM. The primary and secondary phase materials are brought together to form an emulsions using a dual-feed sonolator processor operating at 50° C. and 3,000 psi pressure. The weight ratio of primary-to-secondary phase material is 4:1. The emulsion product is stored in a steel tank to which 10,000 ppm (wt./wt.) of 2-ethylhexyl nitrate is added. The resulting fuel is transferred to shipping containers for offsite usage such as ship propulsion, or consumed on site in an industrial boiler or diesel generator for the production of heat or power.

INCORPORATION BY REFERENCE

All of the U.S. patents and U.S. published patent applications cited herein are hereby incorporated by reference.

EQUIVALENTS

Those skilled in the art will recognize, or be able to ascertain using no more than routine experimentation, many equivalents to the specific embodiments of the invention described herein. Such equivalents are intended to be encompassed by the following claims.

What is claimed is:

1. A fuel mixture, wherein the fuel mixture consists essentially of:
   (a) a fuel, wherein the fuel consists essentially of a biodiesel or a biodiesel and a petroleum product;
   (b) glycerol and water, wherein water is present in an amount less than about 30% (wt/wt) of the glycerol; and
   (c) a surfactant or a mixture of surfactants,
      wherein
      the mixture contains less than about 0.1% by mass elemental sulfur; and
      either (i) the fuel is present as a plurality of droplets substantially evenly dispersed in the glycerol and water, or (ii) the glycerol and water are present as a plurality of droplets substantially evenly dispersed in the fuel.

2. The fuel mixture of claim 1, wherein the fuel consists essentially of a biodiesel.

3. The fuel mixture of claim 1, wherein the fuel consists essentially of a biodiesel and a petroleum product.

4. The fuel mixture of claim 1, wherein the fuel consists essentially of a biodiesel and a petroleum product; and the petroleum product is ultra-low sulfur diesel.

5. The fuel mixture of claim 1, wherein the fuel is present in an amount from about 1% to about 99% (vol/vol).

6. The fuel mixture of claim 1, wherein the fuel is present in an amount from about 65% to about 99% (vol/vol).

7. The fuel mixture of claim 1, wherein the fuel is present in an amount from about 40% to about 65% (vol/vol).

8. The fuel mixture of claim 1, wherein glycerol is present in an amount from about 10% to about 60% (vol/vol).

9. The fuel mixture of claim 1, wherein the glycerol is present in an amount of about 18%, about 20%, about 22%, about 24%, about 26%, about 28%, about 30%, about 32%, about 34%, about 36%, about 38%, about 40%, about 42%, about 44%, or about 46% (vol/vol).

10. The fuel mixture of claim 1, wherein water is present in an amount less than 20% (wt/wt) of the glycerol.

11. The fuel mixture of claim 1, wherein the surfactant is a non-ionic surfactant.

12. The fuel mixture of claim 1, wherein the surfactant is selected from the group consisting of a polyethylene glycol, a polyoxyethylene, a glyceride, a polyglycerol, a sorbitan glycoside, an ester, and an acid, and mixtures thereof.

13. The fuel mixture of claim 1, wherein the mixture resists phase separation for 24 h at 25° C. with relative humidity between 50-75%.

14. The fuel mixture of claim 1, wherein the mixture exhibits improved cloud point or improved cold flow characteristics when compared with biodiesel or blends of biodiesel with petroleum products.

15. The fuel mixture of claim 1, wherein the mixture exhibits improved cloud point or improved cold flow characteristics when compared with biodiesel or blends of biodiesel with petroleum products.

16. The fuel mixture of claim 1, wherein the droplets have diameters of from about 100 nm to about 50 micrometers.

17. A method of powering or fueling an engine or boiler comprising combusting a fuel mixture of claim 1.

18. The method of claim 17, wherein the engine is an internal combustion engine.

19. The method of claim 17, wherein the engine is a diesel engine.

* * * * *